Oct. 10, 1944.  W. C. KUNKEL  2,359,996

FLASK CLAMP

Filed July 5, 1943

Wallace C. Kunkel.
INVENTOR.

BY
ATTORNEYS.

Patented Oct. 10, 1944

2,359,996

UNITED STATES PATENT OFFICE 2,359,996

FLASK CLAMP

Wallace C. Kunkel, Houston, Tex.

Application July 5, 1943, Serial No. 493,582

1 Claim. (Cl. 144—297)

This invention relates to flask clamps such as generally employed for holding together the cope and drag of a flask of the type used in foundries, and has for its general object the provision of an improved type of clamp for this purpose.

In the past the parts of flasks have been ordinarily clamped together by means such as a C-shaped member with a separate wedge member inserted between one of the arms of the C-shaped member and the adjacent flange on the flask. Such a wedge is driven between the arm of the C-shaped member and the flange and thereby the two flanges of the respective flask parts are clamped together. Such a structure, however, involves the use of two dissimilar parts for each clamp and this is a source of annoyance and inconvenience because very frequently one of the parts becomes misplaced or is out of reach when needed, and further because of the necessity for holding the C-shaped member rigidly while the wedge is driven into place.

It is, therefore, an object of the present invention to provide a flask clamp consisting of only one integral part.

A further object of this invention is to provide a flask clamp which can be very readily applied and which will avoid the necessity for rigidly holding one part while inserting and driving home another.

Another object of this invention is to provide a flask clamp which will be relatively very simple and inexpensive to manufacture.

Other objects and advantages of this invention will become apparent from the following description taken in connection with the accompanying drawing wherein is set forth by way of illustration and example, one embodiment thereof.

Figure 1:
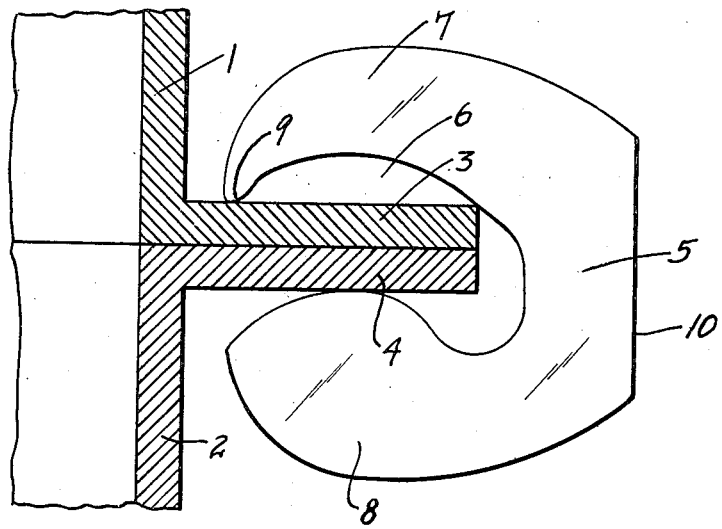
Fig. 1 is a fragmentary view showing a portion of the cope and drag of a flask in transverse cross section, with a clamp constructed in accordance with this invention shown in side elevation in clamping position thereon.
Figure 2:
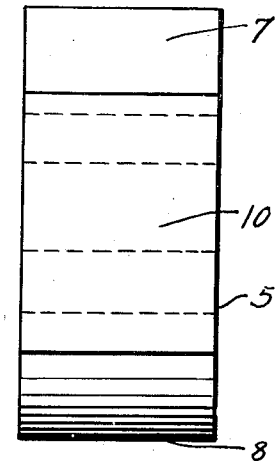
Fig. 2 shows an end elevation of the flask clamp illustrated in Fig. 1.

Referring more in detail to the drawing, the numeral 1 designates the cope and the numeral 2 the drag of a flask, the cope having a laterally extending flange 3 and the drag a corresponding flange 4, with these two flanges fitting together in the usual manner.

The flask constructed in accordance with this invention is designated generally at 5 and is of substantially C-shaped formation. However, the space 6 between the arms 7 and 8 of this clamp is not a rectangular shaped space and the arms 7 and 8 do not have relatively flat parallel clamping surfaces thereon as is the case with the usual C-shaped member forming a part of the customary flask clamp. Instead, the arms 7 and 8 are so formed that the space 6 between them is arcuate. It will be understood that while the term arcuate is used in describing this space, the structure is not limited to one in which this space is bounded by circular arcs. On the contrary it is not at all necessary that the arcs be circular, but they may be of any desirable curved formation so long as they are of such corresponding shapes as to provide a space between them which is substantially curved and of reasonably uniform width.

The dimensions of the space between the arms of the C-shaped clamping member will, of course, vary depending upon the dimensions of the flanges 3 and 4 but generally speaking this space should be wide enough so that it will readily admit the two flanges at the open end of the C-shaped member but narrow enough so that as the C-shaped member is moved to cause it to fit over the flanges it will become tight on the flanges while the ends of its arms are still a reasonable distance from the inner edges of the flanges. This is clearly illustrated in Fig. 1.

It will further be noted that the end of the arm 7 is rounded slightly as shown at 9 so that it will not tend to dig into the flange 3 but will instead slide over it readily.

The clamping member 5 is placed over the flanges of two flask parts in the manner shown in Fig. 1 and its outer end is then struck with a hammer or the like to drive it firmly into place. Because of the curved formation of the space which receives the flanges, the flanges will be clamped together by this single member without the necessity for the use of a separate wedge as in previous constructions.

Figure 3:
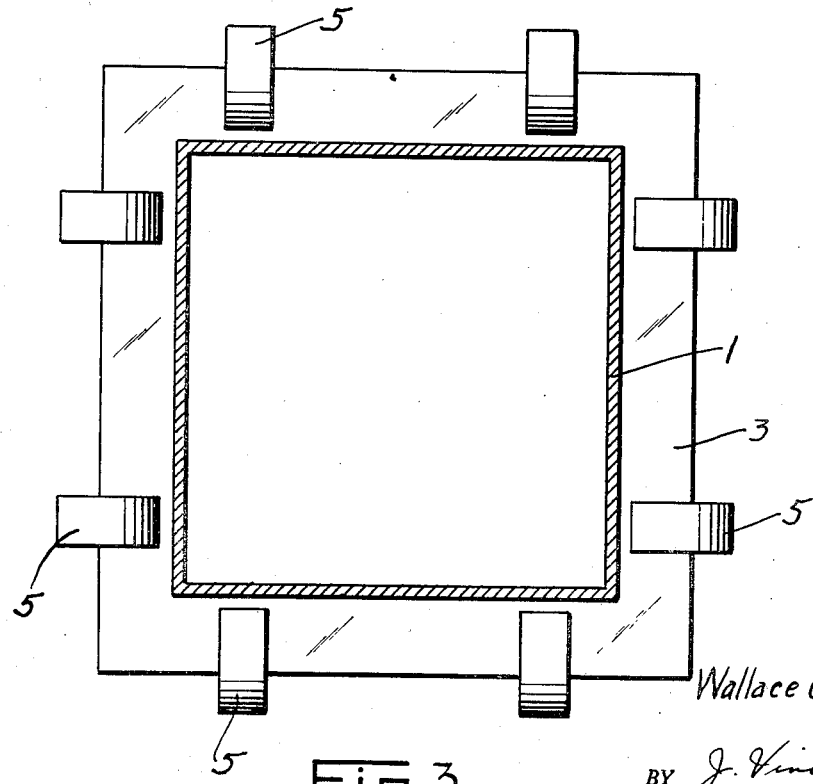
Fig. 3 shows a view partly in top plan and partly in horizontal cross section through the cope of a flask, the parts of which are held together by clamps constructed in accordance with this invention.

In Fig. 3 there is illustrated partly in section the cope 1 having the usual laterally extending flange 3, and this view illustrates how a plurality of the clamps 5 such as shown in Fig. 1 may be used for clamping the parts of the flask together.

Preferably the base end of the C-shaped clamping member is formed with a flat external portion as shown at 10 so as to provide a surface for receiving the blows to be struck in driving it home.

The clamping member just described may be made in any desired manner for forming metal parts and may be made of any material possessing suitable characteristics of strength and rigidity. Thus, for example, it may readily be cast or forged in substantially the shape in which it is to be used and because there are no parts or surfaces which require accurate fitting it will not be necessary to machine the member so cast or forged. Thus it may be easily and cheaply constructed and will be very simple to use since it consists of only a single part and requires no rigid holding during its application.

A means has, therefore, been provided for carrying out the objects and advantages set forth for this invention.

Having described my invention, I claim:

In a flask clamp, a substantially C-shaped member the arms of which are formed with opposed substantially parallel concave and convex surfaces respectively to provide an arcuate space between them, said space being of substantially uniform width from the outer to the inner ends of said arms and being of a width to relatively loosely receive at its entrance the flanges of a flask which are to be clamped together, and the width of said opening and the curvature thereof being such that a chord connecting the extremities of the concave surface will be spaced from the nearest point of the convex surface by a distance less than the combined thickenss of the flanges to be clamped together, so that said flanges will become tightly wedged in the said space before the edges thereof engage the inner extremity of said arcuate space.

WALLACE C. KUNKEL.